(12) United States Patent
Chou et al.

(10) Patent No.: US 6,341,942 B1
(45) Date of Patent: Jan. 29, 2002

(54) ROTATOR MEMBER AND METHOD

(75) Inventors: Chen-Yu J. Chou, Cincinnati; Gerald A. Pauley, Hamilton; Paul S. Stephens, Sharonville; Michael H. Schneider, Loveland, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/466,156

(22) Filed: Dec. 18, 1999

(51) Int. Cl.⁷ .................................................. F01D 5/14
(52) U.S. Cl. .................... 416/228; 416/242; 416/223 A
(58) Field of Search ........................... 416/242, 243, 416/223 A, 500, 229 R, 230, 228

(56) References Cited

U.S. PATENT DOCUMENTS

| | | | |
|---|---|---|---|
| 1,049,571 A | * 1/1913 | Freeman | 416/242 |
| 1,469,973 A | * 10/1923 | Thompson | 416/243 |
| 1,895,252 A | * 1/1933 | Kontos | 416/242 |
| 3,942,231 A | 3/1976 | Whitaker | 29/156.8 B |
| 4,118,147 A | 10/1978 | Ellis | 416/230 |
| 4,886,421 A | * 12/1989 | Danson | 416/236 R |

* cited by examiner

Primary Examiner—Edward K. Look
Assistant Examiner—Ninh Nguyen
(74) Attorney, Agent, or Firm—Andrew C. Hess; Nathan D. Herkamp

(57) ABSTRACT

A rotator member, for example an airfoil of a rotating blade, is provided with additional stiffness in a radially outer portion of the member by including in the outer portion at least one corrugation extending generally along the width, for example chordwise, of the member.

23 Claims, 3 Drawing Sheets

ROTATOR MEMBER AND METHOD

BACKGROUND OF THE INVENTION

This invention relates to rotator members for rotation with a rotating means; and, more particularly, to an airfoil member for circumferential rotation in a fluid about an axis.

Modern axial flow turbine engines, for example aircraft gas turbine engines, include rotor members for general circumferential rotation about an engine axis. Such rotator members include blading members with an airfoil, typical of which are rotating fan, compressor and turbine blades. Helicopter rotary and fixed wing aircraft propeller blades are other examples of rotator members.

Rotator members designed for use in the fan section of large aircraft gas turbine engines are examples of relatively large airfoil shaped cantilevered rotators intended to rotate in air at relatively high speeds. As is well known in the art, this results in their structure experiencing excitation from the combination of rotational speed and airflow, particularly in that half portion of the airfoil toward the airfoil outer tip. Design and manufacture of blades for such applications have been widely reported in the art, typical of which are U.S. Pat. No. 3,892,612—Carlson et al. (patented Jul. 1, 1975); U.S. Pat. No. 4,118,147—Ellis (patented Oct. 3, 1978); and U.S. Pat. No. 5,279,892—Baldwin et al. (patented Jan. 18, 1994).

One type of excitation of particular significance with such relatively large fan and compressor blades sometimes is referred to as stripe mode resonance. This is a vibratory mode that is a high frequency resonance phenomenon associated with wakes of airflow generated upsteam of an airfoil. Such mode, involving stress and deformation, generally is localized in the radial outer half of the airfoil, primarily in the airfoil tip region which undergoes predominantly chordwise bending. Attempts to avoid stripe mode resonance have included embedding a patch in the airfoil tip region determined to have such an occurrence, for example as shown in the above-identified Ellis patent.

Another type of detrimental airfoil excitation and vibration can occur as a result of a foreign airborne object, such as a bird, striking the airfoil during engine operation. Damage to the airfoil can cause excessive vibration not only to the engine but also to the aircraft structure. An attempt to increase airfoil chordwise stiffness and to reduce the chordwise bending and shear stress from impact has involved adding a tip cap to the airfoil. However, such a tip cap adds extra mass that can redistribute centrifugal pull force and increase spanwise stresses along the blade trailing edge near the blade's root.

BRIEF SUMMARY OF THE INVENTION

The present invention, in one form, provides a rotator member having a radial length for general circumferential rotation about an axis, a thickness and a width greater than the thickness. The member comprises a radially lengthwise inner portion extending about half of the radial length and an radial lengthwise outer portion extending about half of the radial length outwardly from the inner portion. The outer portion includes at least one corrugation extending generally along the width of the member.

In another form, the present invention provides a method for making a rotator member with widthwise stiffness by incorporating in the outer portion of the member at least one generally widthwise corrugation.

DETAILED DESCRIPTION OF THE INVENTION

Figure 1:
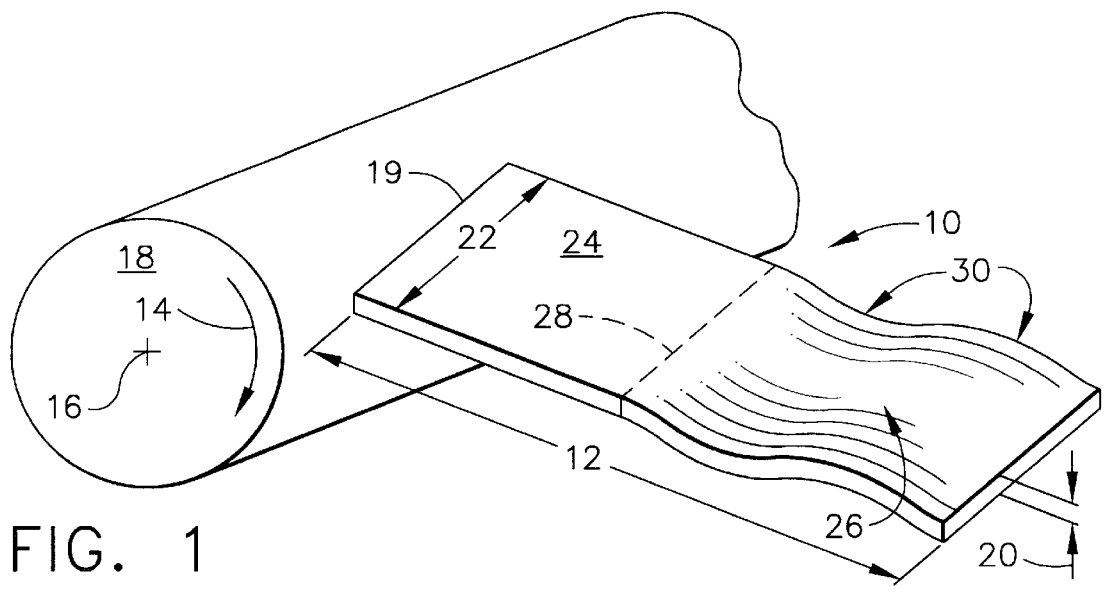
FIG. 1 is a fragmentary perspective diagrammatic view of one embodiment of a rotator member carried by a rotating means.

Relatively large solid or hollow metal blades have been used in gas turbine engines as fan blades, as well as in the form of rotary blades for helicopter and fixed wing aircraft propellers. However, more modern designs to reduce weight have included laminated composite structures including various combinations of metal and non-metal composites, as has been widely reported in the art, some of which has been identified above. Such composite laminates inherently are weaker in shear strength than a metal counterpart. Therefore, delamination between composite layers is of concern. In addition, it has been recognized that shear stresses are reduced by an increase of chordwise stiffness.

Problems experienced with rotating gas turbine engine fan blades, especially when rotating at high speed, have occurred as a result of impact by bird ingestion, for example during take-off or landing events. Resultant blade airfoil damage can cause excessive, detrimental vibration and damage to the engine and aircraft structure. In a composite airfoil, typical damage is material loss at the trailing edge tip, normally induced by a large deflection gradient between the airfoil leading edge near the bird impact zone and the trailing edge tip away from the impact zone. Such large deflection gradient near the airfoil tip can induce such events as fiber breakage and delarnination, ultimately resulting in complete separation of the airfoil trailing edge at the tip, in as short a time as one revolution of the member after impact. The present invention avoids such detrimental results from bird impact by improving chordwise stiffness in a manner that reduces the blade tip deflection by about 1000–4000%, as determined by computer simulation of engine operating conditions. As a result of less blade tip deflection gradient, the trailing edge material loss from medium bird impact (i.e. 4 pound bird impact) was reduced, and in some examples, totally eliminated.

Another type of detrimental chordwise bending can occur when a rotating metal airfoil experiences excitation from airflow or rotational speed: it will respond in different modes depending on operating conditions. Such a response can result in cracking of the airfoil tip induced by the above described stripe mode resonance producing a chordwise bending motion between the airfoil tip leading and trailing edges. The present invention provides generally chordwise stiffening through a corrugation feature integrally within the airfoil.

It has been recognized that the radially outer half or outer half of the span length of a blading member is significantly more subject to chordwise bending and resonance than is the inner half. In some relatively large, composite fan blade designs, a metal tip cap has been added to the airfoil tip and the trailing edge blade tip to increase the blade chordwise stiffness and to reduce the chordwise bending moment and shear stress. However, the extra mass from added material such as the metal tip cap will redistribute centrifugal pull force and increase spanwise stresses along the blade trailing edge near the blade root or base. In addition, blade design is limited by centrifugal force induced pull and bending stresses at the blade root. A blade is designed using a blade stacking line to position the center of gravity of each airfoil section such that the pull force minimizes root bending stresses.

The present invention improves chordwise or generally widthwise stiffness in a blade airfoil, representative of a rotator member, by providing at least one airfoil chordwise or generally airfoil widthwise corrugation as a geometrical feature of the member, without introducing additional material to or within an existing structure design. The corrugation, which is at an offset position from the blade stacking line or stacking axis in that radially outer half of the airfoil toward the blade tip, is substantially chordwise of the airfoil so as not adversely to affect aerodynamic flow. In a blading member, particularly a relatively large blade for example a large rotating fan or compressor blade, it is preferred that the offset portion or corrugation be offset from the stacking line by an amount of about 10–90% of the wall thickness dimension at the corrugated airfoil section. Generally in a turbine engine blade airfoil, the offset amount is in the range of about 20–50% of such wall thickness dimension. Further, it is preferred that the corrugation is disposed generally chordwise of the airfoil at a position in the radially outer portion of the airfoil at least about 50% along the span or length of the airfoil. This places the corrugation toward the airfoil tip where more severe bending occurs. Particularly with the relatively low density composite materials currently used for such blades, the stacking line offset does not substantially increase blade root bending stresses. The number of, and general widthwise or chordwise direction of, corrugations is determined for each rotator member from such factors as specific rotator member frequency margin, minimizing any tip rub, and improving flow reaction at the member radial outer tip. The corrugation design feature built into the rotator member uses a geometrical effect instead of a metal tip cap or other added object to enhance the member's widthwise or chordwise stiffness. In addition, a preferred form of the present invention used in a blading member maintains a cross sectional shape that substantially does not affect design aerodynamic flow while providing increased chordwise stiffness to reduce vibration and bending in the radially outer portion of a blading member airfoil.

The present invention will be more fully understood by reference to the drawings. FIG. 1 is a diagrammatic fragmentary perspective view of one embodiment of the rotator member of the present invention shown generally at 10. Rotator member 10 has a radial length 12 for general circumferential rotation, shown by arrow 14, about an axis of rotation 16, for example of a rotating means 18 that carries member 10 at position 19. One example of such an assembly is a rotary blading member 10 carried at a base or root 19 by a rotating shaft or drum 18 in a gas turbine engine. Rotator member 10 further is defined by a thickness 20 and a width 22 greater than thickness 20. Radial length 12 of member 10 includes two generally half portions: radially inner portion 24 and radially outer portion 26. Outer portion 26 extends radially outwardly from inner portion 24, for example as determined from broken line 28 as the general boundary between the portions.

According to this form of the present invention, it has been found that by including within the structure of member 10 at least one corrugation 30, extending generally along width 22 in outer portion 26, the stiffness of outer portion 26 is increased in the direction of width 22. Such design increases chordwise stiffness of a rotator member in the form of an airfoil, avoiding such problems as airfoil delamination and/or detrimental stripe mode resonance. In FIG. 1, a pair of corrugations 30 is shown, generally defining a double curve in outer portion 26, for example of a type shown more clearly in FIG. 3. As used herein, the term "corrugation" means a geometrical change or inflection from a shape, generally deviating from and returning to a normal geometrical shape or feature. For example, the members shown in the drawings include a pair of connected corrugations 30 together generally defining an "S" type curve deviating from the normal shape of the member in that portion. As shown, each corrugation is half of the length of the "S" type curve or wave. A corrugation is any partial or any percent of the length of the "S" type curve or wave that is deviated from the stacking axis of the airfoil cross section from 50% of the span length to the blade tip.

Figure 2:
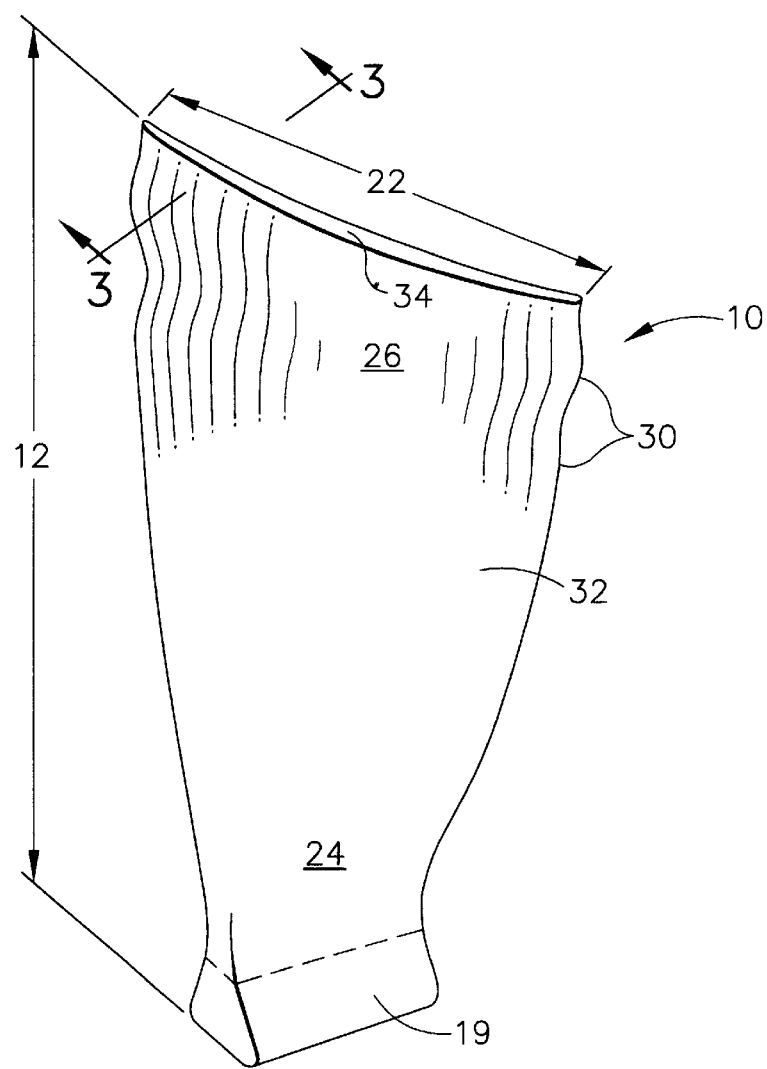
FIG. 2 is a diagrammatic perspective view of a rotator member in the form of a gas turbine engine fan blade.

The diagrammatic perspective view of FIG. 2 shows one embodiment of a rotator member 10 in the form of an airfoil 32 of a gas turbine engine fan blade. Airfoil 32 includes airfoil tip 34 in outer portion 26; and inner portion 24 is connected at an end with blade base or root 19, for example for cooperation with a rotating means such as 18 in FIG. 1. Airfoil radially length or span 12 of airfoil 32 extends spanwise of the airfoil from blade root 19 to airfoil tip 34. Width 22 of airfoil 32 extends generally chordwise of the airfoil between radially lengthwise edges of the airfoil. Shown in the outer portion 26 of airfoil 32 is a pair of corrugations 30, extending for a corrugation width the full extent of and along airfoil width 22. Corrugations 30 are designed to be offset by an offset amount 33 from airfoil stacking line 36, as shown in FIG. 3.

Figure 3:
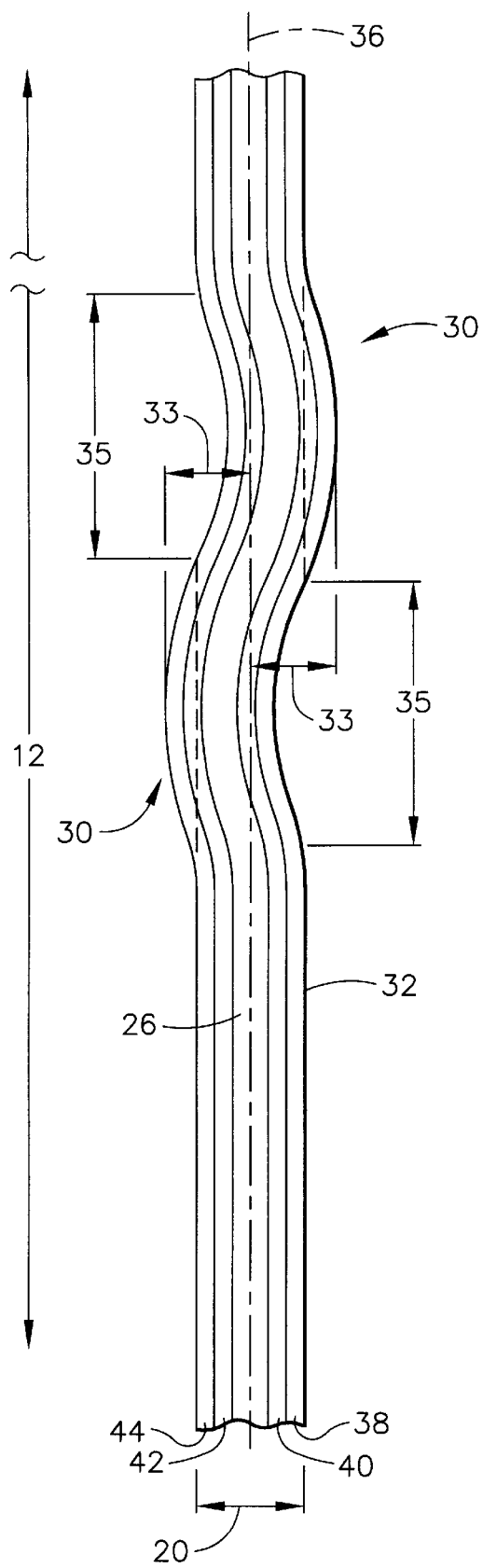
FIG. 3 is a fragmentary lengthwise (spanwise) sectional view through the thickness of the blade of FIG. 2.

The fragmentary view of FIG. 3 is a portion of a section through airfoil thickness 20 of radially outer portion 26 of airfoil 32 in FIG. 2, taken along the airfoil span or length 12. Shown in FIG. 3 are the two corrugations 30 of FIG. 2 extending generally chordwise of the airfoil, generally symmetrically disposed from airfoil stacking line 36. Each corrugation 30 is offset by the offset amount 33 from stacking line 36 and each is of a corrugation spanwise length 35 as measured generally along radial length 12. Such symmetrical positioning of a plurality of corrugations about stacking line 36 is preferred to reduce centrifugal force bending load on blade root 19. In the embodiment of FIG. 3, airfoil 32 comprises a plurality of composite layers or plies, for example metal matrix composite plies or fiber reinforced composite plies, represented by plies 38, 40, 42, and 44, stacked and bonded together as is well known and described in the art. One example of such art is described in U.S. Pat. No. 3,942,231—Whitaker, patented Mar. 9, 1976.

In one form of the manufacture of a layered blade according to the present invention, one or more corrugations offset from the stacking line can be preformed appropriately in each ply prior to stacking and bonding. In other manufacturing methods, including manufacture of metal blades as well as composite blades, one or more corrugations can be shaped after formation of an airfoil preform or during formation of a non-layered airfoil by fiber weaving.

As shown in the embodiment of FIG. 3, the cross sectional shape of the airfoil including the corrugations according to a form of the present invention substantially will not affect design aerodynamic airflow while providing outer portion 26 with chordwise resistance to vibration and bending. For example, in a large gas turbine engine composite fan blade airfoil, the offset amount from the stacking line of the generally chordwise extending corrugation is at least about 10–90%, and preferably about 20–50%, of the airfoil thickness dimension 20 at the corrugated airfoil section.

It has been recognized that, according to a form of the present invention in a turbine engine blading member, the following combination of dimensions are preferred for each corrugation located at a position in the radially lengthwise outer portion of an airfoil, at least about 50% of the airfoil radial length from the blade root toward the airfoil tip: a corrugation spanwise length 35 in the range of about 10–30 to 1, more preferably about 20 to 1, of the offset amount 33 of the corrugation from the stacking line 36; and a corrugation chordwise width, for example as measured along width 22 in FIG. 1, in the range of about 40–80 to 1, more preferably about 60 to 1, of the offset amount 33 of the corrugation from the stacking line 36. The preferred dimensions for and position of a corrugation in an airfoil of a turbine engine blading member are based on relationships more specific to such a member. The corrugation spanwise length to offset amount is affected by airfoil tip clearance and airfoil performance. The greater the aspect ratio of the corrugation spanwise length to offset amount, the larger will be the negative impact on the airfoil tip clearance to affect tip rub. In addition, a corrugation spanwise length to offset amount of less than about 10 to 1 will adversely affect performance efficiency and created flow disturbance at a corrugation. Also, it has been found that location of a corrugation at a position less than about 50% of the airfoil radial length from the blade root toward the airfoil tip will not reduce an airfoil tip deflection gradient sufficiently to reduce material loss from bird impacts.

In current gas turbine engine fan and compressor blades, a corrugation is preferred at positions at least about 80% of such radial length to locate a corrugation toward or in the vicinity of the airfoil tip. In addition, it is preferred that the corrugation have an offset amount in an airfoil in the range of about 0.01–1", and in the range of about 0.1–0.5" for relatively large airfoils as are found in fan blades.

Figure 4:
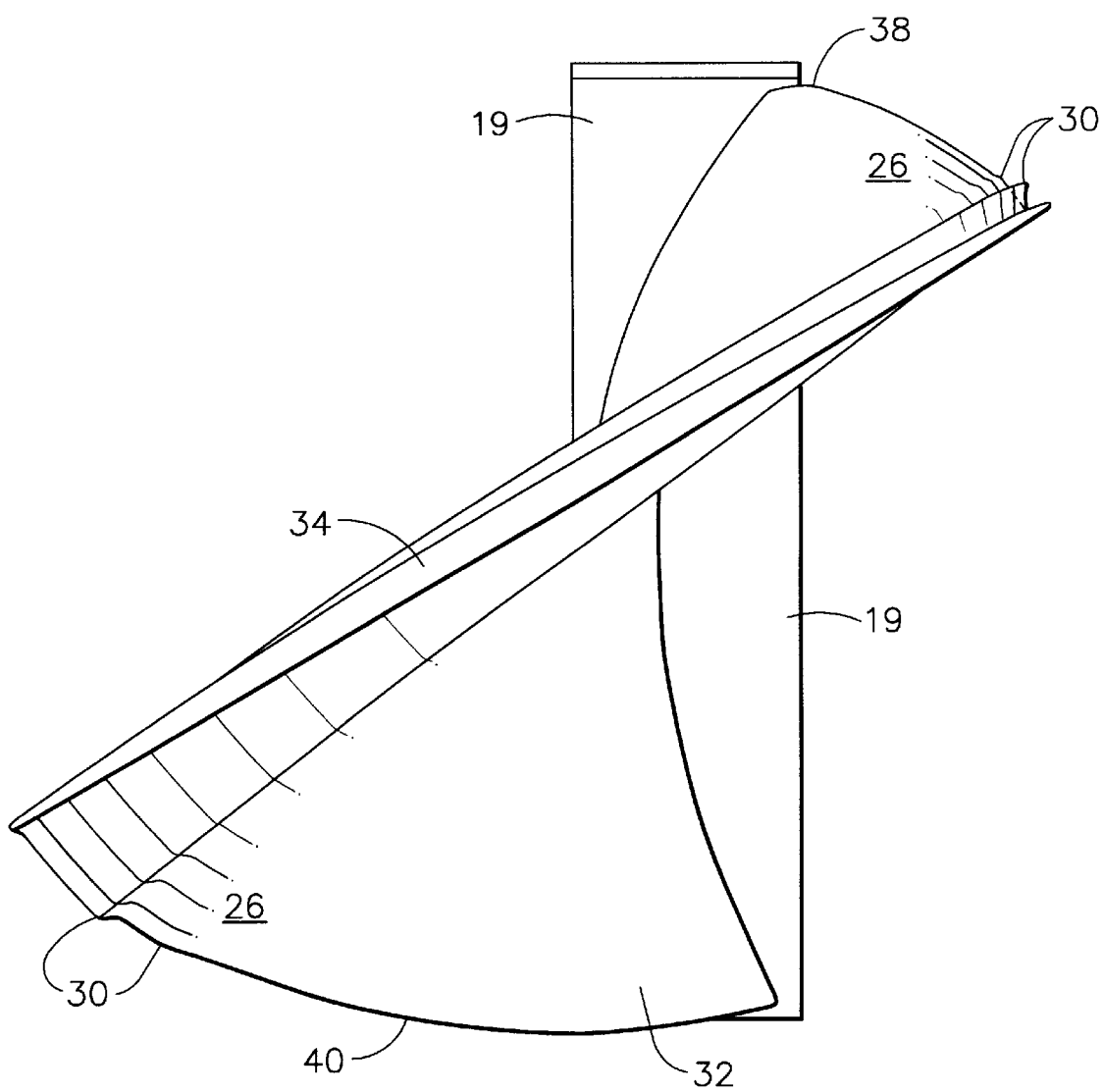
FIG. 4 is a top view of a typical fan blade airfoil of the type shown in FIG. 2 showing the general type of complex twist designed into such an airfoil.

FIG. 4 is a top chordwise view of the airfoil 32 of FIG. 2, showing a typical complex twist of such an airfoil about a stacking line such as 36 in FIG. 3. Shown in radial outer half 26 are corrugations 30, starting at airfoil leading edge 38 and extending generally chordwise through the airfoil to trailing edge 40.

A variety of reported methods can be used in the manufacture of a rotator member or member preform. These methods include the above identified composite article manufacture using stacked composite plies of various solid or woven types, as well as other types of press forming of metal or composite structures using forming dies with a combination of heat and pressure.

The present invention provides a rotator member with enhanced widthwise stiffness by inclusion within the structure of the member a geometrical feature in the form of at least one widthwise corrugation in a radially outer portion of the member. Although the invention has been described in connection with a variety of specific forms, embodiments, examples, methods and materials, it should be understood that they are intended to be typical of, rather than in any way limiting on, the scope of the invention. Those skilled in the various arts involved will understand that the invention is capable of variations and modifications without departing from the scope of the appended claims.

What is claimed is:

1. A rotator member in the form of an airfoil having a radial length for general circumferential rotation about an axis, a thickness, and a width disposed chordwise of the airfoil and greater than the thickness, the member comprising a radially lengthwise inner portion extending about half of the radial length, and a radially lengthwise outer portion extending about half of the radial length radially outwardly from the inner portion, wherein:

the outer portion includes at least one corrugation extending generally along the width of the member generally chordwise of the airfoil;

the airfoil is defined in part by a stacking line; and, the corrugation is offset by an offset amount from the stacking line.

2. The rotator member of claim 1 in which:

the airfoil includes an airfoil thickness dimension at the currugation; and, the corrugation is offset from the stacking line by about an offset amount of about 10–90% of the air thickness dimension.

3. The rotator member of claim 2 in which the offset amount is in the range of about 20–50% of the airfoil thickness dimension.

4. The rotator member of claim 2 in the form of a turbine engine blading member in which the offset amount is in the range of about 0.01–".

5. The rotator member of claim 4 in which the offset amount is in the range of about 0.1–0.5 ".

6. The rotator member of claim 2 in which:

the corrugation is defined in part by a spanwise length; and, the spanwise length is in the range of about 10–30 to 1 of the offset amount.

7. The rotator member of claim 6 in which the spanwise length is about 20 to 1 of the offset amount.

8. The rotator member of claim 6 in which:

the corrugation is defined in part by a chordwise width; and, the chordwise width is in the range of about 40–80 to 1 of the offset amount.

9. The rotator member of claim 8 in which the chordwise width is about 60 to 1 of the offset amount.

10. The rotator member of claim 1 in which there is a plurality of corrugations in the outer portion disposed substantially symmetrically about the stacking line.

11. The rotator member of claim 10 in which:

the airfoil includes an airfoil thickness dimension at the corrugation; and, each corrugation is offset from the stacking line by an offset amount of about 10–90% of the airfoil thickness dimension at the corrugation.

12. A rotator blading member comprising an airfoil and a root at an end of the airfoil, the airfoil having an airfoil spanwise length for general circumferential rotation about an axis, an airfoil thickness, and an airfoil chordwise width, the airfoil comprising a spanwise inner portion extending from the root about half of the airfoil spanwise length, and a spanwise outer portion extending about half of the airfoil spanwise length radially outwardly from the inner portion, the airfoil being defined in part by a stacking line, wherein:

the outer portion includes at least one corrugation extending generally along the airfoil chordwise width; and, the corrugation is offset from the stacking line by an offset amount of about 10–90% of the airfoil thickness at the corrugation.

13. The blading member of claim 12 as a gas turbine engine fan or a compressor blade in which the corrugation is in the outer portion at an airfoil spanwise position at least about 50% of the airfoil spanwise length from the root.

14. The blading member of claim 13 in which:

the corrugation is defined in part by a corrugation spanwise length and a corrugation chordwise width; and, the corrugation spanwise length is in the range of about 10–30 to 1 of the offset amount.

15. The blading member of claim 14 in which the corrugation chordwise width is in the range of about 40–80 to 1 of the offset amount.

16. The blading member of claim 15 in which the offset amount is in the range of about 0.01–1".

17. The blading member of claim 12 comprising an airfoil of a plurality of bonded composite plies in which there is a plurality of corrugations in the airfoil spanwise outer portion disposed substantially symmetrically about the stacking line.

18. In a method for providing additional stiffness to a rotator member comprising an airfoil and a root at an end of the airfoil, the airfoil having an airfoil spanwise length for general circumferential rotation about an axis, an airfoil thickness, and an airfoil chordwise width, the airfoil comprising an airfoil spanwise inner portion extending from the root about half of the airfoil spanwise length, and an airfoil spanwise outer portion extending about half of the airfoil spanwise length radially outwardly from the inner portion, the airfoil being defined in part by a stacking line, the step of:

providing within the outer portion at least one corrugation extending generally along the airfoil chordwise width; and, providing the corrugation offset from the stacking line by an offset amount of about 10–90% of the airfoil thickness at the corrugation.

19. The method of claim 18 in which the corrugation is provided offset from the stacking line in the offset amount of about 20–50% of the airfoil thickness.

20. The method of claim 19 in which the offset amount is provided in the range of about 0.01–1".

21. The method of claim 18 in which:

the corrugation is defined in part by a corrugation spanwise length and a corrugation chordwise width; and, the corrugation spanwise length is provided in the range of about 10–30 to 1 of the offset amount.

22. The method of claim 21 in which the corrugation chordwise width is provided in the range of about 40–80 to 1 of the offset amount.

23. The method of claim 18 for providing additional stiffness to a gas turbine engine fan blade rotator member comprising the airfoil and the root, the steps of:

providing within the outer portion a plurality of corrugations each extending generally along the airfoil chordwise width and disposed substantially symmetrically about the stacking line at a spanwise position at least about 50% of the airfoil spanwise length from the root;

each corrugation being provided offset from the stacking line by the offset amount.

* * * * *